United States Patent
Matsunaga et al.

(10) Patent No.: US 6,925,824 B2
(45) Date of Patent: Aug. 9, 2005

(54) APPARATUS FOR DRIVING A COMPRESSOR AND A REFRIGERATING AIR CONDITIONER

(76) Inventors: Mutsunori Matsunaga, c/o Shimizu Works, Hitachi Air Conditioning Systems Co., Ltd. 390 Shimizumuramatsu, Shizuoka-shi, Shizuoka-ken 424-0926 (JP); Kenji Tojo, c/o Shimizu Works, Hitachi Air Conditioning Systems Co., Ltd. 390 Shimizumuramatsu, Shizuoka-shi, Shizuoka-ken 424-0926 (JP); Yoshikatsu Tomita, c/o Shimizu Works, Hitachi Air Conditioning Systems Co., Ltd. 390 Shimizumuramatsu, Shizuoka-shi, Shizuoka-ken 424-0926 (JP); Susumu Nakayama, c/o Shimizu Works, Hitachi Air Conditioning Systems Co., Ltd. 390 Shimizumuramatsu, Shizuoka-shi, Shizuoka-ken 424-0926 (JP); Syunsuke Yasunori, c/o Shimizu Works, Hitachi Air Conditioning Systems Co., Ltd. 390 Shimizumuramatsu, Shizuoka-shi, Shizuoka-ken 424-0926 (JP)

( * ) Notice: Subject to any disclaimer, the term of this patent is extended or adjusted under 35 U.S.C. 154(b) by 0 days.

(21) Appl. No.: 10/656,198

(22) Filed: Sep. 8, 2003

(65) Prior Publication Data

US 2004/0159115 A1 Aug. 19, 2004

(30) Foreign Application Priority Data

Sep. 9, 2002 (JP) .......................................... 2002-262610

(51) Int. Cl.$^7$ ................................................. F25B 49/02
(52) U.S. Cl. ......................... 62/228.4; 62/236; 417/44.1
(58) Field of Search ............................... 62/236, 228.4; 417/15, 42, 44

(56) References Cited

U.S. PATENT DOCUMENTS

| | | | | | |
|---|---|---|---|---|---|
| 4,556,809 A | * | 12/1985 | Beisse et al. | ................ | 310/114 |
| 4,566,289 A | * | 1/1986 | Iizuka et al. | ................ | 62/228.4 |
| 4,856,286 A | * | 8/1989 | Sulfstede et al. | ............... | 62/89 |
| 5,952,757 A | * | 9/1999 | Boyd, Jr. | ................ | 310/156.81 |
| 6,408,645 B1 | * | 6/2002 | Tsuboe et al. | ................ | 62/505 |
| 6,519,959 B2 | * | 2/2003 | Kim et al. | ..................... | 62/211 |

* cited by examiner

Primary Examiner—William E. Tapolcai
(74) Attorney, Agent, or Firm—Antonelli, Terry, Stout & Kraus, LLP (57) ABSTRACT

An apparatus for driving a compressor comprises a compressor having a compression mechanism part for sucking a fluid to compress the same, and an electric motor for driving the compression mechanism part, and an inverter device for driving the electric motor at variable speeds. The electric motor comprises a self-starting type electric motor having a rotor, which comprises a cage conductor and a polarized permanent magnet, and the inverter device comprises a plurality of semiconductor switches for controlling drive frequencies of the electric motor.

4 Claims, 6 Drawing Sheets

APPARATUS FOR DRIVING A COMPRESSOR AND A REFRIGERATING AIR CONDITIONER

BACKGROUND OF THE INVENTION

The present invention relates to an apparatus for driving a compressor and a refrigerating air conditioner, and is specifically suited to an apparatus for driving a compressor used in vapor compression refrigerating cycle, and a refrigerating air conditioner, such as air conditioners, refrigerators, cold storages, or the like, on which the apparatus is mounted.

As an apparatus for driving a compressor according to prior art 1, there is one disclosed in JP-A-5-211796. With the compressor, DC voltage is obtained by supplying an AC power source to a converter, three-phase AC voltage is obtained by supplying the DC voltage to an inverter, and the three-phase AC voltage is further supplied to an armature winding of a brushless DC motor. Further, with the compressor, an induced voltage detection unit is used to detect an induced voltage of the brushless DC motor to indirectly detect pole positions, and an operating frequency command value and a detection signal from the induced voltage detection unit are input, and an inverter control unit supplies to the inverter an inverter control signal for carrying out current control or voltage control, speed control, or the like. In addition, the brushless DC motor comprises a permanent magnet provided on a rotor core.

As an air conditioner according to prior art 2, there is one disclosed in JP-A-2001-3864. The air conditioner includes a refrigerating cycle, in which a compressor, a condenser, a restrictor, and an evaporator are connected together by means of a refrigerant piping, and comprises a permanent-magnet built-in induction motor, which starts as an induction motor at the start of driving the compressor, and causes synchronous pull-in near the number of synchronous revolutions to perform synchronous operation, bidirectional switching elements provided on respective phases of a three-phase circuit, which connects between the permanent-magnet built-in induction motor and three-phase power source for supplying electricity to the permanent-magnet built-in induction motor, and control means for causing intermittent conduction of the switching elements at $1/(6n+1)$ times a frequency of a commercial electric source (n is a positive integer).

As a permanent-magnet electric motor according to prior art 3, there is one disclosed in JP-A-9-322444. The permanent-magnet electric motor comprises a permanent magnet and a cage conductor, which are provided on a rotor, and an inverter device provided integral with a motor body can control operation of the motor. The prior art 3 describes that since the cage conductor is provided on the rotor, the motor can be started and operated as an induction motor when directly operated by a commercial electric source in the case where the inverter device gets out of order.

The prior art 1 involves a problem that while the use of the brushless DC motor makes the apparatus highly efficient as compared with three-phase induction motors, in order to start and drive the brushless DC motor, it is necessary to detect an induced voltage of the brushless DC motor to indirectly detect pole positions to control the inverter device, which leads to complexity in control of the inverter device to make the apparatus expensive. Also, the prior art 1 involves a further problem that since the AC power source supplies electricity to the brushless DC motor simply via the inverter device, operation of the brushless DC motor cannot be continued in the case where the inverter device gets out of order.

Also, the prior art 2 involves a problem that fine control is difficult since the control means simply controls the bidirectional switching elements provided on the respective phases so as to cause intermittent conduction. Also, the prior art 2 involves a further problem that since the AC power source simply supplies electricity to the permanent-magnet built-in induction motor via the bidirectional switching elements, operation of the permanent-magnet built-in induction motor cannot be continued in the case where the bidirectional switching elements get out of order.

Also, the prior art 3 relates to an electric motor but discloses nothing with respect to an apparatus for driving a compressor, and a refrigerating air conditioner. Also, with the prior art 3, in the case where the inverter device gets out of order, it becomes necessary to dismount the inverter device to reconnect directly to a commercial electric source, which is estimated to involve a very troublesome work.

It is an object of the invention to obtain an apparatus for driving a compressor and a refrigerating air conditioner, which use an inexpensive inverter control to be favorable in starting quality and capable of highly efficient operation.

It is another object of the invention to obtain an apparatus for driving a compressor and a refrigerating air conditioner, in which an inexpensive inverter control is used to enable an operation, which is favorable in starting quality and highly efficient, and which can be readily operated with a commercial electric source even when an inverter device gets out of order, and are highly reliable.

Other objects and advantages of the invention will be made apparent from the following description.

BRIEF SUMMARY OF THE INVENTION

To attain the above objects, the invention provides an apparatus for driving a compressor, comprising a compressor having a compression mechanism part for sucking a fluid to compress the same and an electric motor for driving the compression mechanism part, and an inverter device for driving the electric motor at variable speeds, and wherein the electric motor comprises a self-starting type electric motor having a rotor, which comprises a cage conductor and a polarized permanent magnet, and the inverter device comprises a plurality of semiconductor switches for controlling drive frequencies of the electric motor.

To attain the other objects, the invention provides an apparatus for driving a compressor, comprising a compressor having a compression mechanism part for sucking a fluid to compress the same and an electric motor for driving the compression mechanism part, an inverter device for driving the electric motor at variable speeds, and switchover means for switching connection between the compressor and the inverter device, and wherein the electric motor comprises a self-starting type electric motor having a rotor, which comprises a cage conductor and a polarized permanent magnet, and the switchover means is structured so as to be switched over in capable of operating the electric motor either at constant speed with a commercial electric source or at variable speed with the inverter device.

DETAILED DESCRIPTION OF THE INVENTION

A capacity-control type scroll compressor and an air conditioner including the compressor, according to an embodiment of the invention, will be described below with reference to the drawings.

Figure 1:
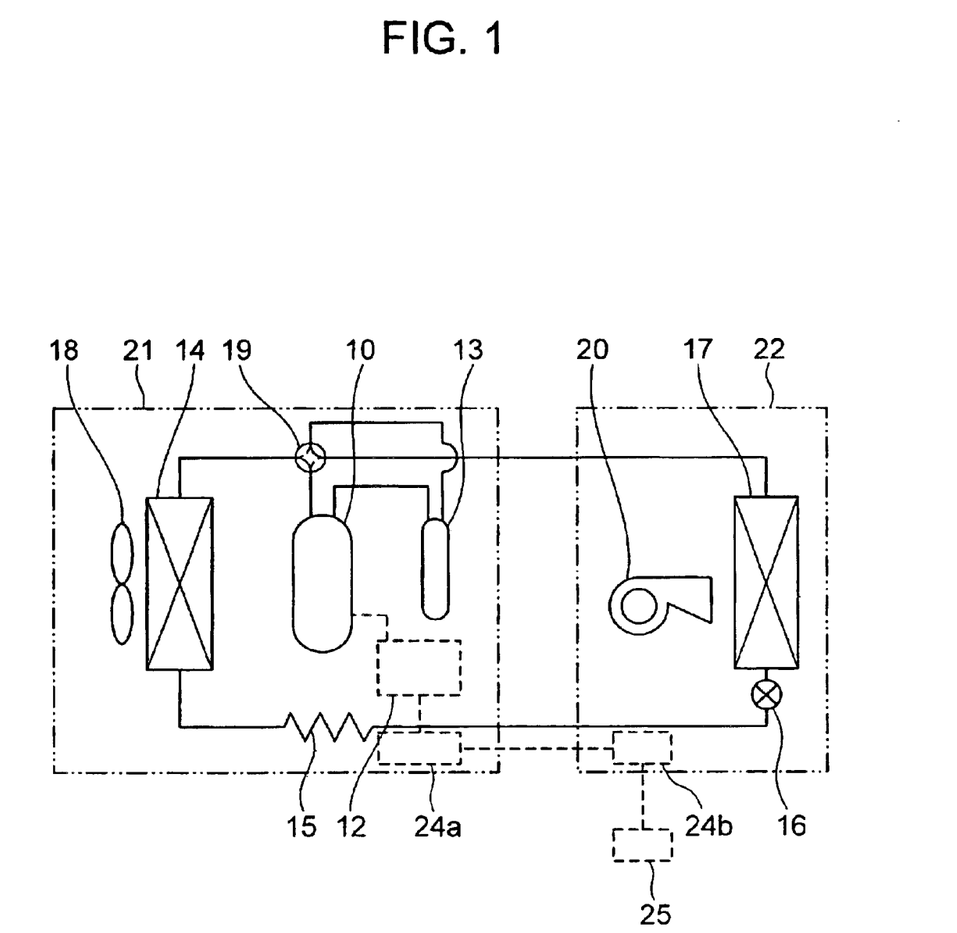
FIG. 1 is a structural view showing an air conditioner according to an embodiment of the invention.

First, the air conditioner according to the embodiment will be described with reference to FIG. 1.

The air conditioner comprises an outdoor machine 21 including a compressor 10, a four-way valve 19, an outdoor heat exchanger 14, an outdoor expansion device 15, an accumulator 13, an outdoor air blower 18, an inverter device 12 and an outdoor control means 24a, and an indoor machine 22 including an indoor expansion device 16, an indoor heat exchanger 17, an indoor air blower 20 and an indoor control means 24b. The outdoor control means 24a and the indoor control means 24b constitute control means 24 (see FIG. 4).

A refrigerating cycle constituting a main part of the air conditioner is formed by connecting the compressor 10, the four-way valve 19 for switching between cooling operating cycle and heating operating cycle, the outdoor heat exchanger 14, which constitutes a condenser or an evaporator, the outdoor expansion device 15, which constitutes a pressure reduction device, the indoor expansion device 16, which constitutes a pressure reduction device, the indoor heat exchanger 17, which constitutes an evaporator or a condenser, and the accumulator 13 by way of a refrigerant piping.

In a cooling operation, the four-way valve 19 is actuated in a manner shown by solid lines to constitute a cooling cycle, in which a refrigerant is caused to flow through the compressor 10, the four-way valve 19, the outdoor heat exchanger 14, the outdoor expansion device 15, the indoor expansion device 16, the four-way valve 19, the indoor heat exchanger 17, the accumulator 13, and the compressor 1 in this order.

In a heating operation, the four-way valve 19 is actuated in a manner shown by dotted lines to constitute a heating cycle, in which the refrigerant is caused to flow through the compressor 10, the four-way valve 19, the indoor heat exchanger 17, the indoor expansion device 16 in a fully opened state, the outdoor expansion device 15, the outdoor heat exchanger 14, the four-way valve 19, the accumulator 13, and the compressor 1 in this order.

An apparatus for driving a compressor in such air conditioner will be described with reference to FIGS. 2 to 6.

Figure 4:
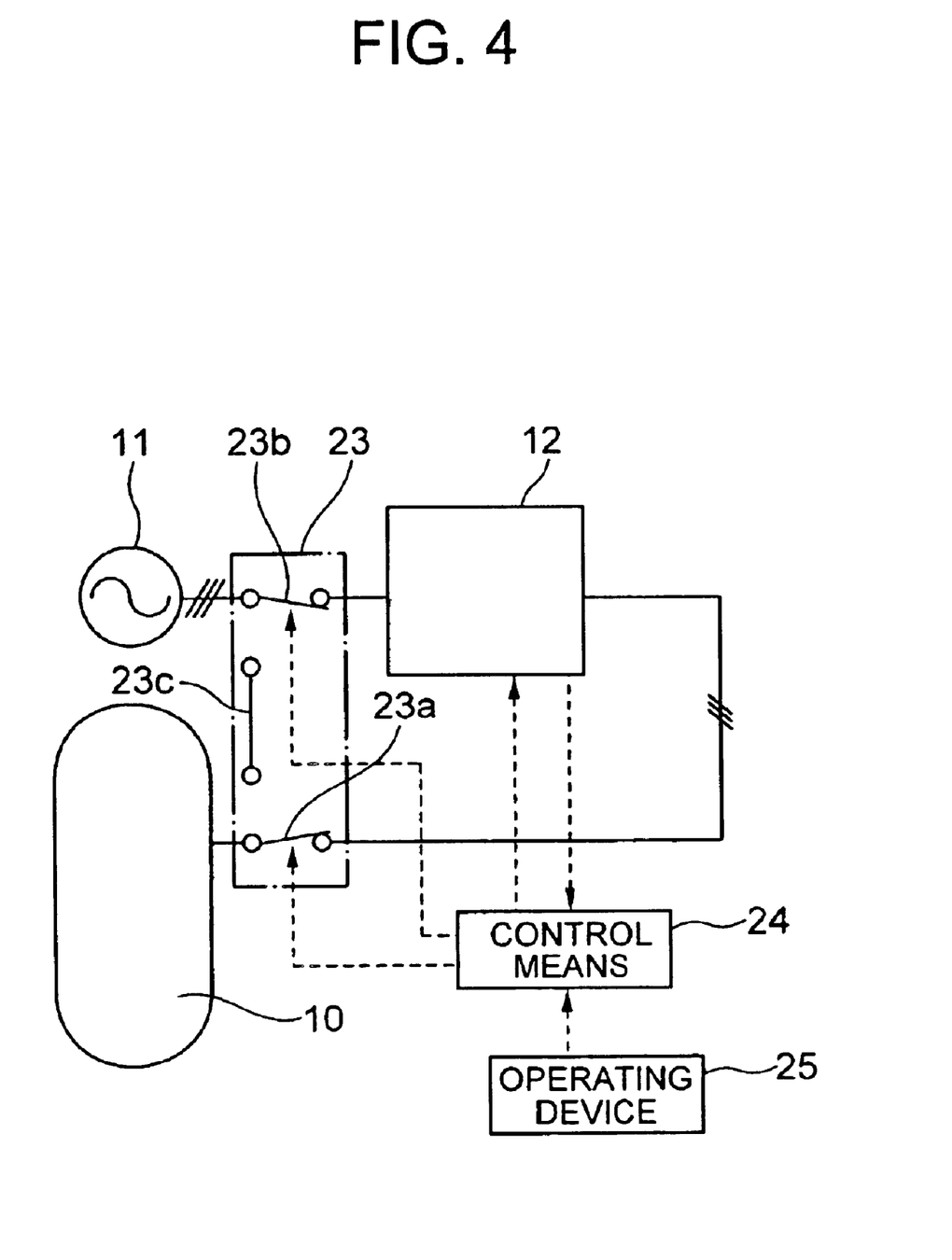
FIG. 4 is a circuit diagram when an inverter device of an apparatus for driving a compressor, in the air conditioner shown in FIG. 1, is energized.
Figure 5:
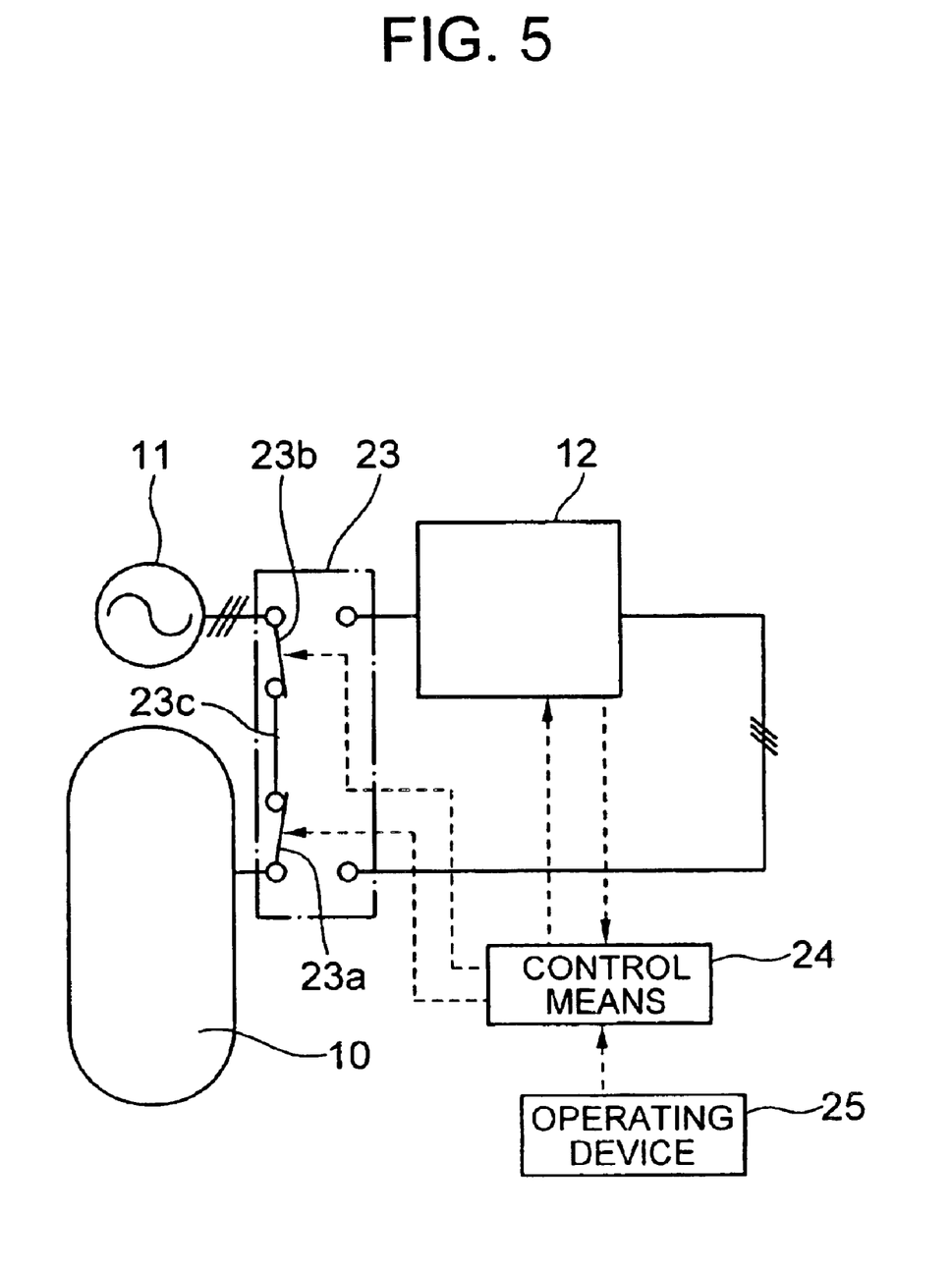
FIG. 5 is a circuit diagram when the inverter device of the apparatus for driving a compressor, in the air conditioner shown in FIG. 1, is not energized.

The apparatus for driving a compressor comprises, as shown in FIGS. 4 and 5, the compressor 10, the inverter device 12, switchover means 23, the control means 24, and an operating device 25. The compressor 10 comprises a scroll compressor.

Figure 2:
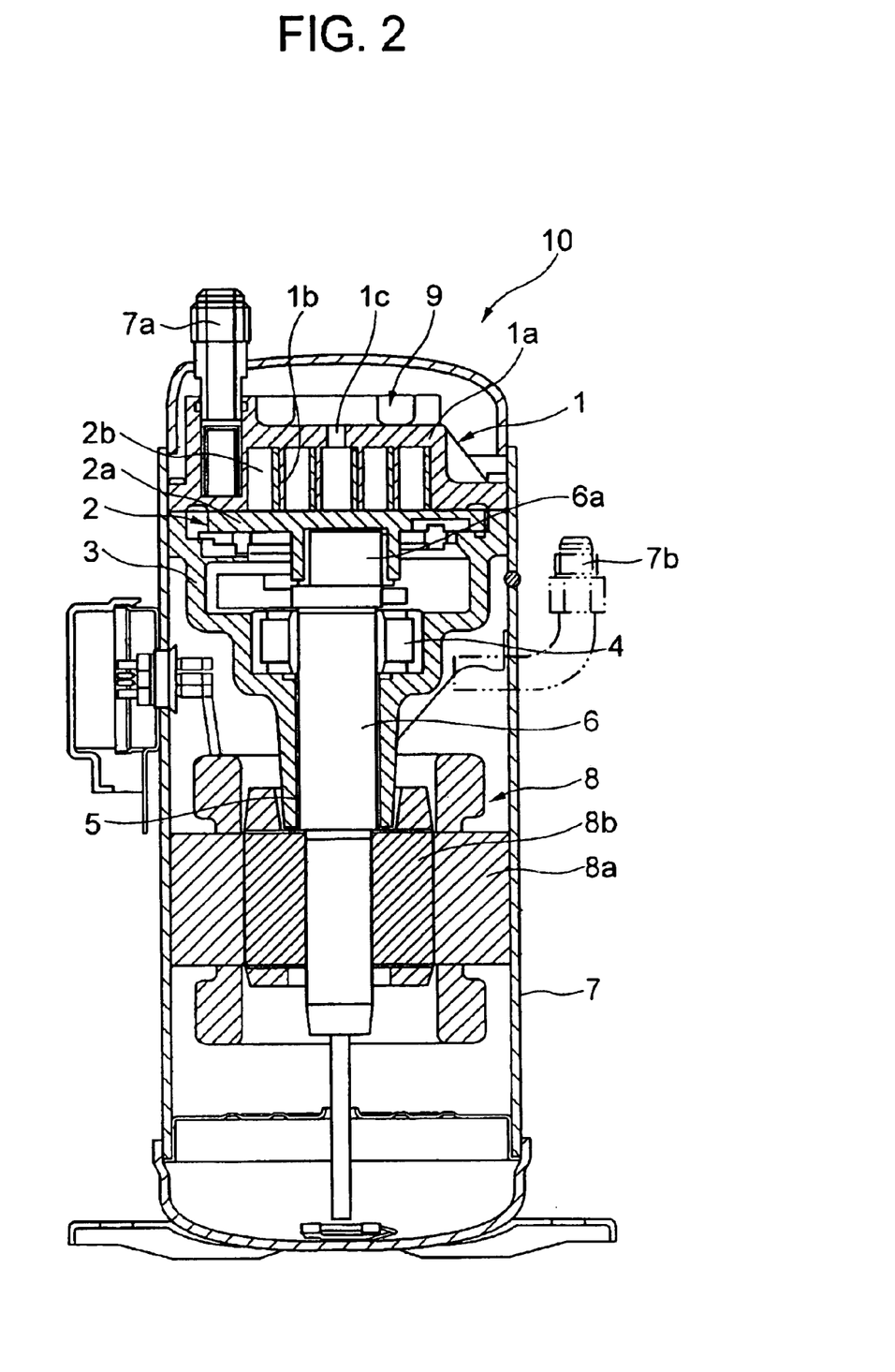
FIG. 2 is a longitudinal, cross sectional view showing a scroll compressor in the air conditioner shown in FIG. 1.

A stationary scroll 1 constituting the compressor 10 comprises, as shown in FIG. 2, an end plate 1a formed to be disk-shaped, and a wrap portion 1b provided upright on the end plate 1a to be spiral in shape. A discharge hole 1c is formed centrally of the end plate 1a. The stationary scroll 1 is fixed to a frame 3 by means of bolts or the like. The frame 3 integral with the stationary scroll 1 is fixed to a closed vessel 7 by means of weld means or the like. Thus, the stationary scroll 1 is fixed to the closed vessel 7 via the frame 3.

An orbiting scroll 2 comprises a disk-shaped end plate 2a, a wrap portion 2b provided upright on the end plate 2a to be spiral in shape, and a boss portion 2c provided centrally on a back surface of the end plate 2a. The orbiting scroll 2 is arranged to face and mesh with the stationary scroll 1, and provided in the frame 3 to be capable of orbiting movement.

The closed vessel 7 is of a closed structure to receive therein a compression mechanism part 9, which comprises the stationary scroll 1, the orbiting scroll 2, the frame 3, and so on, an electric motor 8, which comprises a stator 8a, a rotor 8b, and so on, and a lubricating oil (not shown) fed to slide portions thereof. The compression mechanism part 9 and the electric motor 8 are arranged vertically. The closed vessel 7 withstands high pressures produced by a compressible fluid (refrigerant gases used for the refrigerating cycle in the present embodiment), which is discharged through the discharge hole 1c of the compression mechanism part 9.

A drive shaft 6 fixed to the rotor 8b of the electric motor 8 is rotatably supported on the frame 3 through bearings 4, 5 to be coaxial with an axis of the stationary scroll 1. Provided on a tip end of the drive shaft 6 is a crank 6a made eccentric with respect to an axis of the drive shaft 6. The boss portion 2c of the orbiting scroll 2 is rotatably mounted on the crank 6a through a swing bearing. At this time, the orbiting scroll 2 is put in a state, in which its axis is made eccentric a predetermined distance with respect to the axis of the stationary scroll 1, so that rotation of the drive shaft 6 causes orbiting movement of the orbiting scroll 2.

Upon orbiting movements of the orbiting scroll 2, a plurality of crescent-shaped compression chambers defined between the both wrap portions 1b, 2b move to a central region to be continuously decreased in volume and reach the central region to be communicated to the discharge hole 1c and to each other.

A suction port 7a constitutes a suction part for a working fluid being compressed, and is arranged to be communicated to a compression chamber disposed at an outermost periphery. Also, the discharge hole 1c constitutes a discharge part for a compressed working fluid, and is drilled centrally of the end plate 1a of the stationary scroll 1. A discharge port 7b constitutes a discharge part, through which a compressed working fluid flows outside the closed vessel 7, and is formed to project outside of the closed vessel 7.

When the electric motor 8 is energized and the drive shaft 6 is rotationally driven, the crank 6a of the drive shaft 6 eccentrically is revolved, and such eccentric revolution of the crank 6a is transmitted to the orbiting scroll 2 through the swing bearing. As a result, the orbiting scroll 2 is caused to make orbiting movement with an orbiting radius of a predetermined distance about the axis of the stationary scroll 1.

As the compression chambers defined between the respective wrap portions 1b, 2b move to the central region due to orbiting movement of the orbiting scroll 2, they continuously contract to successively compress the working fluid sucked from the suction port 7a, and the working fluid having been compressed to a predetermined pressure is discharged into the closed vessel 7 through the discharge hole 1c. The working fluid having been discharged passes around the stator 8a and the rotor 8b to be filled into the whole closed vessel 7. The working fluid in the closed vessel 7 is conducted through the discharge port 7b to a refrigerating cycle outside the closed vessel 7.

Figure 3:
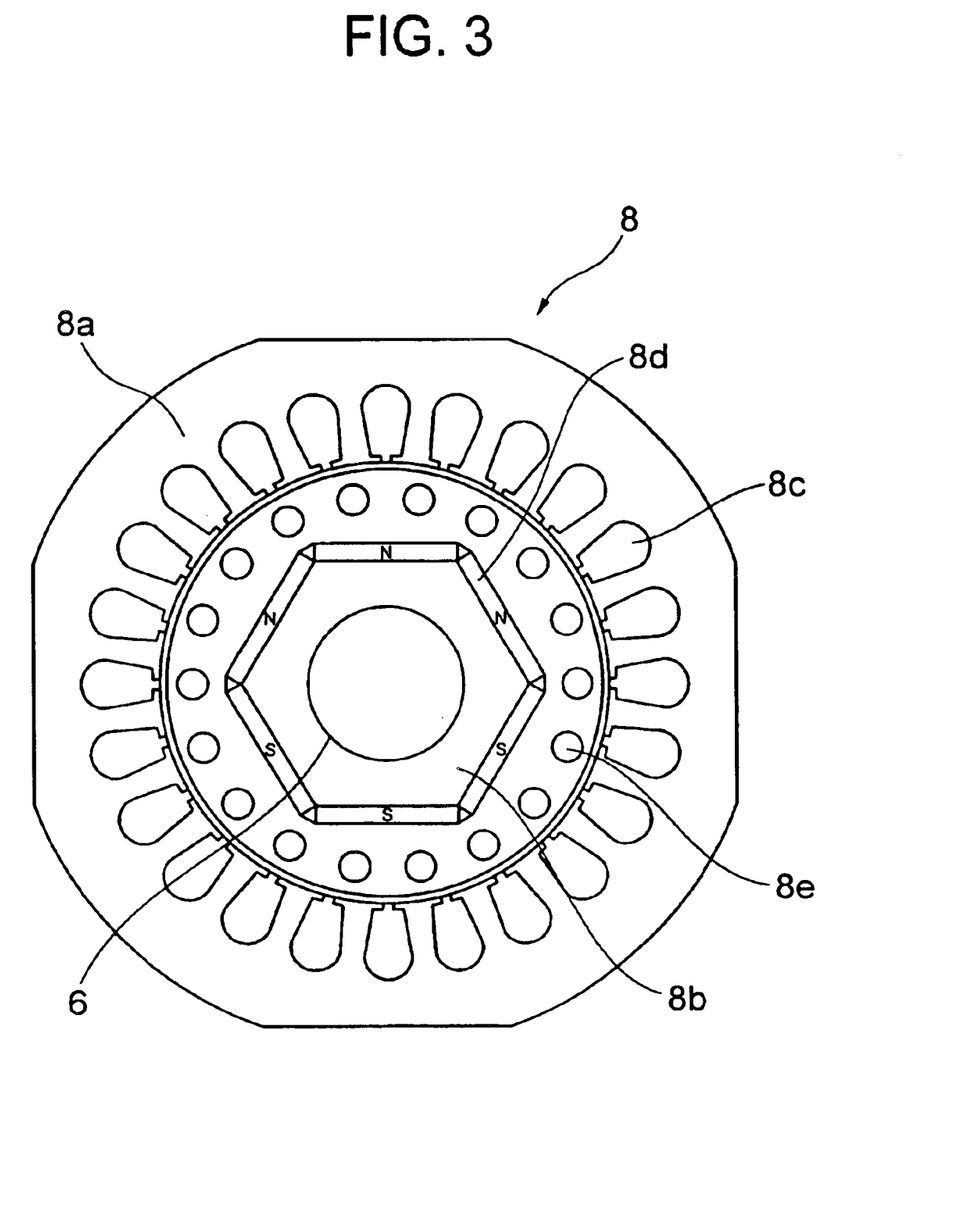
FIG. 3 is a cross sectional view of an electric motor in the compressor shown in FIG. 2.

The electric motor 8 comprises, as shown in FIG. 3, a self-starting type electric motor. A multiplicity of slots are formed in the vicinity of an inner periphery of the stator 8a to be equally spaced, and three-phase windings 8c are provided in the slots. The rotor 8b comprises a permanent magnet 8d polarized in two poles, and a cage conductor 8e comprising a multiplicity of conductors embedded and equally spaced in the vicinity of an outer periphery thereof. Respective poles of the permanent magnet 8d are divided into a plurality of magnets such that three N-pole magnets and three S-pole magnets are arranged circumferentially.

The compressor 10 is connected to a commercial electric source 11 of three-phase via the switchover means 23 and the inverter device 12, as shown in FIGS. 4 and 5.

Figure 6:
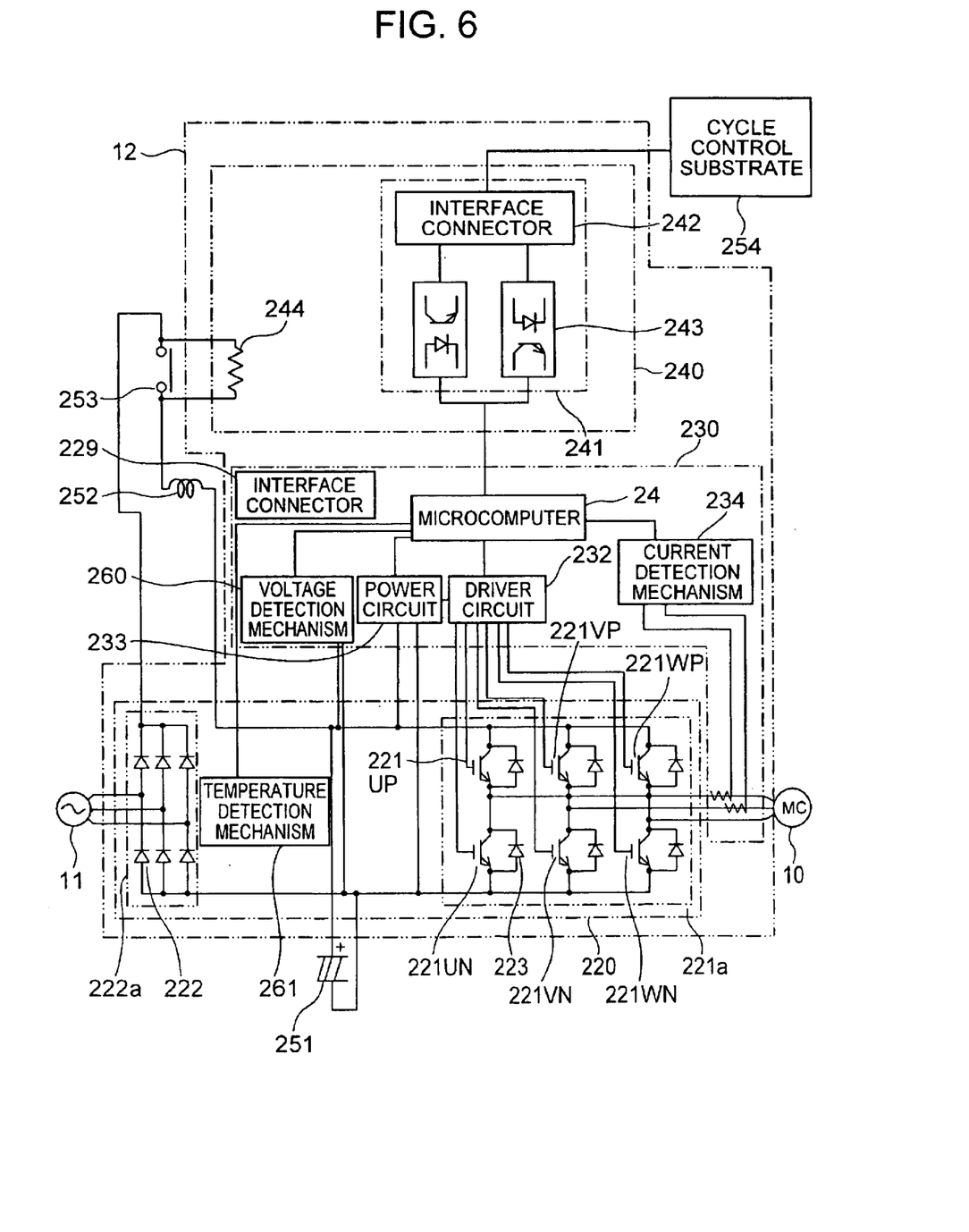
FIG. 6 is a circuit diagram of the inverter device shown in FIG. 4.

The inverter device 12 is constructed as shown in FIG. 6 such that AC voltage from the AC electric source 11 is converted into DC current by a converter unit 222a and an inverter unit 221a, which is a DC/AC converter, is controlled in AC frequency by the control means 24, thereby controlling the compressor 10 variably in rotating speed. The converter unit 222a comprises a plurality of rectifying devices 222 in bridge connection. The inverter unit 221a comprises power conversion means, in which switching elements 221UP, 221UN, 221VP, 221VN, 221WP, 221WN are bridge-connected in three-phase, and flywheel elements 223 are connected to these elements.

A smoothing capacitor 251 is connected between the converter unit 222a and the inverter unit 221a. Also, the converter unit 222a and the inverter unit 221a are connected to each other through a magnet switch 253 and a power-factor reactor 252 in series. A rush-inhibit resistor 244 is connected between contacts of the magnet switch 253.

Connected to the control means 24 are a power circuit 233 for driving the control means, a driver circuit 232 for driving the inverter unit 221a, a temperature detection mechanism 261 for detecting a temperature of the inverter device 12 (a temperature of a first substrate 220 in an example shown), a voltage detection mechanism 260 for detecting DC voltage fed to the inverter unit 221a, and a current detection mechanism 234 for detecting current fed to the compressor 10 from the inverter unit 221a.

The converter unit 222a, the inverter unit 221a and the temperature detection mechanism 261 are mounted on the first substrate 220. The power circuit 233, the driver circuit 232, the voltage detection mechanism 260, the current detection mechanism 234, and an interface connector 229 are mounted on a second substrate 230.

The control means 24 is connected to devices mounted on a cycle control substrate 254 via an interface 241. The interface 241 comprises an interface connector 242 and photo-couplers 243, and is mounted on a third substrate 240.

The switchover means 23 comprises, as shown in FIGS. 4 and 5, two change-over switches 23a, 23b and a bypass line 23c. The change-over switch 23a switchingly connects the compressor 10 to the inverter device 12 and the bypass line 23c, and the change-over switch 23b switchingly connects the commercial electric source 11 to the inverter device 12 and the bypass line 23c. That is, the switchover means 23 switches the compressor 10 between a constant-speed operation with the commercial electric source and a variable-speed operation with the inverter device.

The control means 24 controls the inverter device 12 and the switchover means 23 on the basis of signals from the operating device 25 operated by a user of a concerned air conditioner and detection sensors for detecting operating conditions of the air conditioner, and detects failures in the inverter device 12 to control the switchover means 23. The operating device 25 comprises remote controls, and the detection sensors comprise sensors for detecting indoor and outdoor temperatures, temperatures of respective parts in the refrigerating cycle, indoor humidity, and so on.

Normally, the compressor 10 is operated while being connected to the commercial electric source 11 via the inverter device 12. In order to control an inverter device for driving a brushless DC motor, the compressor of the prior art 1 needs the function of detecting magnetic pole positions of a rotor and controlling a current-phase to optimize the relationship between the magnetic pole positions and magnetic pole positions generated by stator windings.

According to the embodiment of the invention, however, the inverter device 12 does not necessarily need the function of controlling a current-phase. More specifically, the electric motor 8 operates as an induction motor owing to the action of the three-phase windings 8c and the cage conductor 8e until reaching a synchronous revolution from starting, and operates as a synchronous motor owing to the action of the three-phase windings 8c and the permanent magnet 8d when reaching the synchronous revolution. Therefore, matching of the current-phase control by the inverter device 12 with the electric motor 8 is unnecessary, so that the inverter device 12 can be made simple in control and the compressor 10 is hard to cause failures in starting. Also, while the electric motor 8 is operated in synchronous revolution, no secondary current is generated in the rotor 8b, so that the electric motor can be operated efficiently and takes effect on development of ability since slip is 0. Also, capacity control of the compressor 10 can be made by using the inverter device 12 to change the number of synchronous revolutions.

In the case where the inverter device 12 gets out of order, such trouble is detected by the temperature detection mechanism 261, the voltage detection mechanism 260, and the current detection mechanism 234 to actuate the control means 24, and the switchover means 23 is switched over as shown in FIG. 5 to connect the compressor 10 directly to the commercial electric source 11. Thereby, operation of the compressor 10 can be continued as a constant-speed type compressor. That is, when trouble in the inverter device 12 is detected, the change-over switches 23a, 23b are correspondingly and automatically switched over and connected to the bypass line 23c from the inverter device 12.

As apparent from the above description, according to the invention, it is possible to obtain an apparatus for driving a compressor and a refrigerating air conditioner, which use an inexpensive inverter control to be favorable in starting quality and capable of highly efficient operation.

Also, according to the invention, it is possible to obtain an apparatus for driving a compressor and a refrigerating air conditioner, in which an inexpensive inverter control is used to enable an operation, which is favorable in starting quality and highly efficient, and which can be readily operated by a commercial electric source even when an inverter device gets out of order, and are highly reliable.

What is claimed is:

1. An apparatus for driving a compressor, comprising a compressor having a compression mechanism part for sucking a fluid to compress the same and an electric motor for driving the compression mechanism part, an inverter device for driving the electric motor at variable speeds, and switchover means for switching connection between the compressor and the inverter device, wherein the electric motor comprises a self-starting type electric motor having a rotor, which comprises a cage conductor and a polarized permanent magnet, and the switchover means is structured so as to change over operation of the electric motor either at constant speed with a commercial electric source or at variable speed with the inverter device.

2. An apparatus according to claim 1, further comprising control means for automatically switching the switchover means to a constant-speed operation with a commercial electric source from a variable-speed operation with the inverter device when trouble in the inverter device is detected.

3. A refrigerating air conditioner comprising:

a refrigerating cycle, in which a compressor, an outdoor heat exchanger, an expansion device and an indoor heat exchanger are connected together by means of a refrigerant piping;

an inverter device for driving the compressor at variable speeds;

switchover means for switching connection between the compressor and the inverter device, and control means for controlling the compressor; wherein the compressor comprises a compression mechanism part for sucking a fluid to compress the same, an electric motor for driving the compression mechanism part, and a closed vessel receiving therein the compression mechanism part and the electric motor, and the control means controls the inverter device on the basis of a control signal, and the electric motor comprises a self-starting type electric motor having a rotor, which comprises a cage conductor and a polarized permanent magnet, and the switchover means is structured so as to change over operation of the electric motor either at constant speed with a commercial electric source or at variable speed with the inverter device.

4. A refrigerating air conditioner according to claim 3, further comprising control means for automatically switching the change-over switch to a constant-speed operation with a commercial electric source from a variable-speed operation with the inverter device when trouble in the inverter device is detected.

* * * * *